United States Patent
Suh

(10) Patent No.: US 9,826,396 B2
(45) Date of Patent: Nov. 21, 2017

(54) METHOD AND APPARATUS FOR TRANSRECEIVING PRIVACY INFORMATION

(71) Applicant: Samsung Electronics Co., Ltd., Gyeonggi-do (KR)

(72) Inventor: Kyung Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 14/374,872

(22) PCT Filed: Jan. 28, 2013

(86) PCT No.: PCT/KR2013/000677
§ 371 (c)(1),
(2) Date: Jul. 25, 2014

(87) PCT Pub. No.: WO2013/112025
PCT Pub. Date: Aug. 1, 2013

(65) Prior Publication Data
US 2014/0378101 A1 Dec. 25, 2014

(30) Foreign Application Priority Data
Jan. 26, 2012 (KR) .................. 10-2012-0007564

(51) Int. Cl.
*H04M 1/66* (2006.01)
*H04M 1/68* (2006.01)
(Continued)

(52) U.S. Cl.
CPC ............ *H04W 12/02* (2013.01); *H04W 4/005* (2013.01); *H04W 4/02* (2013.01); *H04W 4/22* (2013.01)

(58) Field of Classification Search
CPC ....... H04W 12/02; H04W 4/005; H04W 4/02; H04W 4/22
(Continued)

(56) References Cited

U.S. PATENT DOCUMENTS 5,752,162 A * 5/1998 Sawyer .............. H04B 7/18556
455/13.1
5,805,203 A * 9/1998 Horton ............... H04N 7/17309
348/E7.07
(Continued)

FOREIGN PATENT DOCUMENTS

EP 2320689 A1 5/2011
KR 10-2005-0014362 2/2005
WO WO 2011/083997 A2 * 7/2011 .............. H04W 8/22

OTHER PUBLICATIONS

International Search Report dated May 31, 2013 in connection with International Patent Application No. PCT/KR2013/000677, 5 pages.
(Continued)

Primary Examiner — Rafael Pérez-Gutiérrez
Assistant Examiner — Mark G. Pannell

(57) ABSTRACT

A method and an apparatus for transmitting and receiving privacy information are disclosed. The method includes transmitting a connection (ATTACH) message including a terminal type indication, privacy type, privacy indication, and transmission period, receiving a connection complete (ATTACH ACCEPT) message; and transmitting location information. According to the embodiments of the present invention, the method and the apparatus for transmitting and receiving privacy information can provide an adequate protection for the privacy information in a terminal.

18 Claims, 13 Drawing Sheets

(51) Int. Cl.
  *H04M 3/16*   (2006.01)
  *H04W 24/00*  (2009.01)
  *G08C 17/00*  (2006.01)
  *H04L 12/28*  (2006.01)
  *H04L 12/56*  (2006.01)
  *H04W 12/02*  (2009.01)
  *H04W 4/00*   (2009.01)
  *H04W 4/22*   (2009.01)
  *H04W 4/02*   (2009.01)

(58) Field of Classification Search
  USPC .............. 455/404.1, 404.2, 411, 456.1–457
  See application file for complete search history.

(56) References Cited

U.S. PATENT DOCUMENTS

| | | | | |
|---|---|---|---|---|
| 6,963,917 | B1* | 11/2005 | Callis | G06F 9/5033 |
| | | | | 709/227 |
| 7,184,405 | B1* | 2/2007 | Hummel | H04Q 11/0478 |
| | | | | 370/236 |
| 8,320,894 | B1* | 11/2012 | Raghunath | H04M 3/42229 |
| | | | | 370/310.2 |
| 2001/0015963 | A1* | 8/2001 | Tuomainen | H04W 52/0216 |
| | | | | 370/311 |
| 2003/0163430 | A1* | 8/2003 | Takaku | H04N 7/17318 |
| | | | | 705/52 |
| 2004/0081139 | A1* | 4/2004 | Beckmann | H04W 76/007 |
| | | | | 370/352 |
| 2005/0159142 | A1* | 7/2005 | Giniger | H04L 67/18 |
| | | | | 455/414.3 |
| 2010/0153207 | A1* | 6/2010 | Roberts | G01C 21/3679 |
| | | | | 705/14.41 |
| 2010/0210269 | A1* | 8/2010 | Shuai | H04W 36/0022 |
| | | | | 455/436 |
| 2011/0075675 | A1* | 3/2011 | Koodli | H04L 12/14 |
| | | | | 370/401 |
| 2012/0094680 | A1* | 4/2012 | Stackelius | H04W 72/1242 |
| | | | | 455/452.1 |
| 2013/0028184 | A1* | 1/2013 | Lee | H04W 8/22 |
| | | | | 370/328 |
| 2013/0041997 | A1* | 2/2013 | Li | H04L 67/12 |
| | | | | 709/223 |

OTHER PUBLICATIONS

Written Opinion of International Searching Authority dated May 31, 2013 in connection with International Patent Application No. PCT/KR2013/000677, 4 pages.

He Qi, et al., "The Quest for Personal Control over Mobile Location Privacy", IEEE Communications Magazine, May 2004, pp. 130-136.

* cited by examiner

METHOD AND APPARATUS FOR TRANSRECEIVING PRIVACY INFORMATION

CROSS-REFERENCE TO RELATED APPLICATION(S)

The present application claims priority under 35 U.S.C. §365 to International Patent Application No. PCT/KR2013/000677 filed Jan. 28, 2013 entitled "METHOD AND APPARATUS FOR TRANSRECEIVING PRIVACY INFORMATION." International Patent Application No. PCT/KR2013/000677 claims priority under 35 U.S.C. §365 and/or 35 U.S.C. §119(a) to Korean Patent Application No. 10-2012-0007564 filed Jan. 26, 2012. All of these patent applications are incorporated herein by reference into the present disclosure as if fully set forth herein.

TECHNICAL FIELD

The present invention relates to a communication network and, more particularly, to a method for transmitting and receiving privacy information in a wireless communication network.

BACKGROUND ART

Recently, desired information can be easily obtained and transmitted by connecting objects existing in our surroundings regardless of time and place, and thereby M2M/IoT (Machine-to-Machine/Inter Of Things) supporting various services became a major issue in the next generation communication market.

The M2M started with a sensor and RFID network mainly for a local area, however various wired or wireless networks can be used with it as objects and characteristics of application are diversifying. Recently, interest in M2M based on a mobile communication network is increasing because it can support mobility of object, wide service area including an island, mountain area, and sea, ease of network operation and maintenance, security for highly reliable data transmission, and guarantee of service quality.

Accordingly, European mobile communication standard organization 3GPP (3rd Generation Partnership Project) started a research for validity of M2M in 2005, and are proceeding regular standardization since 2008 with the name of MTC (Machine Type Communications).

In the respect of 3GPP, 'machine' means an object not requiring a humans operation or intervention, and the MTC is defined as a form of data communication including at least one 'machine' However, division between the MTC and 'machine' becomes obscure because smart phones have been introduced to automatically communicate with a network according to a user's location or situation.

Location information and other privacy information of a terminal can be transmitted through the MTC. However, there are problems in transmitting the location information and privacy information because protection of privacy in a terminal is not fully supported under the structure of conventional system.

DISCLOSURE OF INVENTION

Technical Problem

Aspects of the present invention are to address at least the above mentioned problems and/or disadvantages to provide at least advantages described below. Accordingly, an aspect of the present invention is to provide a method and an apparatus for transmitting and receiving privacy information, which can adequately protect the privacy information.

Solution to Problem

In accordance with an aspect of the present invention, a method for transmitting privacy information is disclosed. The method includes transmitting a connection (ATTACH) message including a terminal type indication, privacy type, privacy indication, and transmission period, receiving a connection complete (ATTACH ACCEPT) message; and transmitting location information.

In accordance with another aspect of the present invention, an apparatus for transmitting privacy information is disclosed. The apparatus include a communication unit configured to transmit a connection (ATTACH) message including a terminal type indication, privacy type, privacy indication, and transmission period, to receive a connection complete (ATTACH ACCEPT) message, and to transmit location information.

Advantageous Effects of Invention

According to the embodiments of the present invention, the method and the apparatus for transmitting and receiving privacy information can provide an adequate protection of the privacy information in a terminal.

BRIEF DESCRIPTION OF THE DRAWINGS

The above and other aspects, features, and advantages of certain embodiment of the present invention will be more apparent from the following description taken in conjunction with the accompanying drawings, in which.

MODE FOR THE INVENTION

Hereinafter, embodiments of the disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the disclosure.

For the same reasons, some components in the accompanying drawings are emphasized, omitted, or schematically illustrated, and the size of each component does not fully reflect the actual size. Therefore, the present invention is not limited to the relative sizes and distances illustrated in the accompanying drawings.

The present invention is to provide a procedure of transmitting and managing privacy information such as location information in an environment of mobile communication system, especially in a terminal supporting an MTC (Machine Type Communication). In the detailed description of the present invention, EPS (Evolved Packet System) based on 3GPP, UTRAN (UMTS Terrestrial Radio Access Network), and GERAN (GSM/EDGE Radio Access Network) will be used. However, any other mobile system may be applicable to the present invention. The procedure of processing information related to a terminal so as to be suitable for the MTC environment can be modified without departing from the scope and spirit of the present invention.

Figure 1:
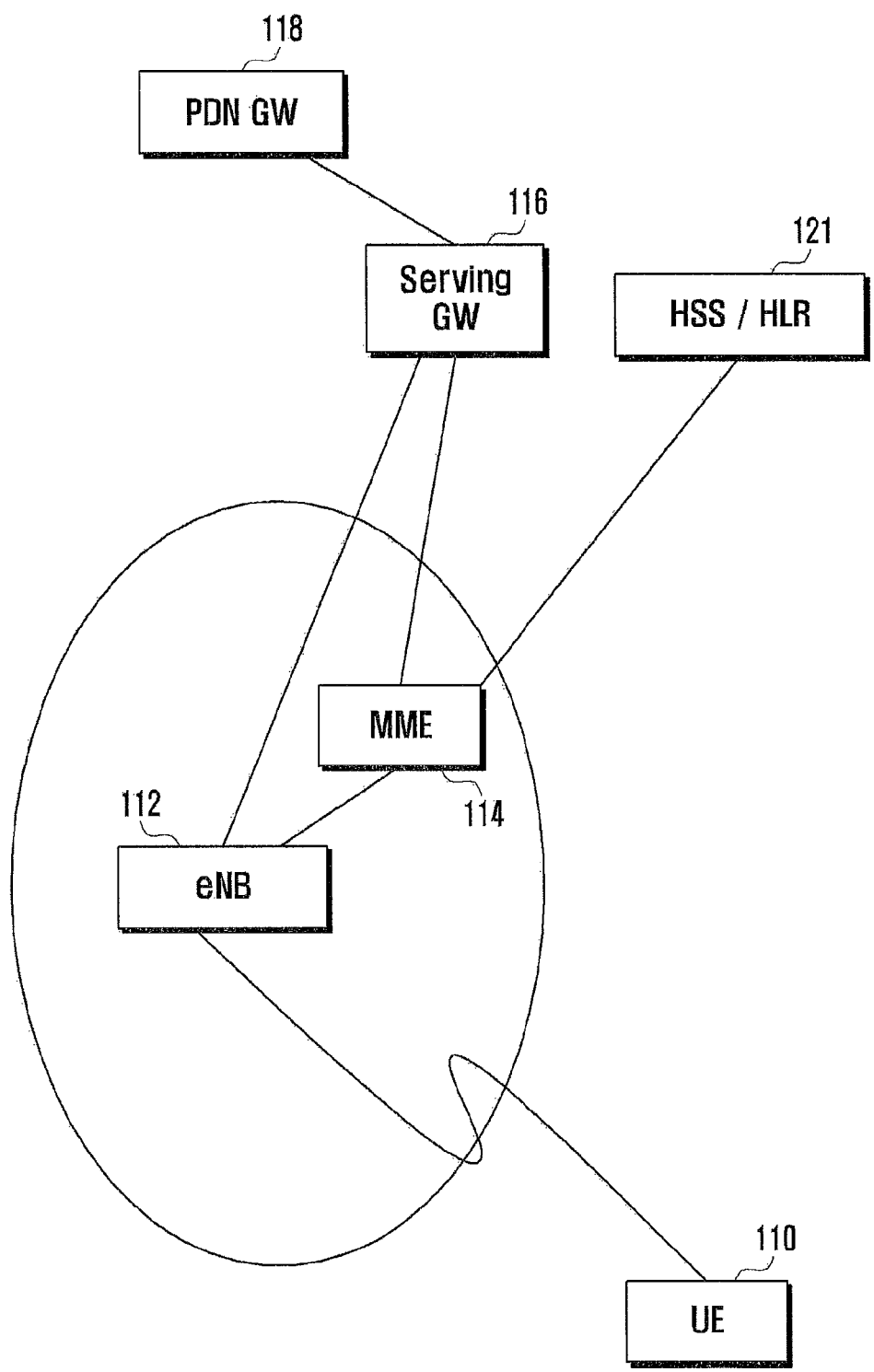
FIG. 1 is a block diagram illustrating a configuration of mobile communication network according to an embodiment of the present invention.

In the meantime, an embodiment of the present invention shown in FIG. 1 is to disclose a communication method for protecting privacy information of a terminal in the environment of EUTRAN (Evolved UTRAN) or 3GPP. Such a method can be changed or modified in other mobile communication systems having a similar technical background and channel type, similar network architecture, similar protocol, or similar operation but different protocol, without departing from the scope and spirit of the present invention. This will be apparent to those skilled in the art.

FIG. 1 is a block diagram illustrating a configuration of mobile communication network according to an embodiment of the present invention.

Here, a system structure of 3GPP EPS is illustrated in FIG. 1 as an example. The present invention will be described for the case of EUTRAN, which can be also used for other similar mobile communication systems.

Referring to FIG. 1, the mobile communication system according to an embodiment of the present invention includes a terminal (UE; User Equipment) 110, base station (eNB, eNodeB: evolved Node B) 112, serving gateway (SGW: Serving GW) 116, packet data network gateway (PGW: PDN GW) 118, home subscriber server (HSS)/home location register (HLR)/authentication center (AUC) 121, and mobility management entity (MME) 114.

The terminal 110 performs a communication with the base station 112 by setting wireless connection. The terminal 110 connects with a packet data network 118 such as an internet through the serving gateway 116. Further, the mobile communication system include a HSS/HLR/AUC 121 to manage authentication information and service information of a user and terminal 110. Further, the mobile communication system includes an MME 114 as an entity for managing mobility and location registration of the terminal 110.

Hereafter, detailed operations of the UE 110, HSS 121, eNB 112, MME 114, and other network entities for protecting user privacy based on a protocol used for mobile and internet communication will be described referring to FIGS. 2 to 9.

Figure 2:
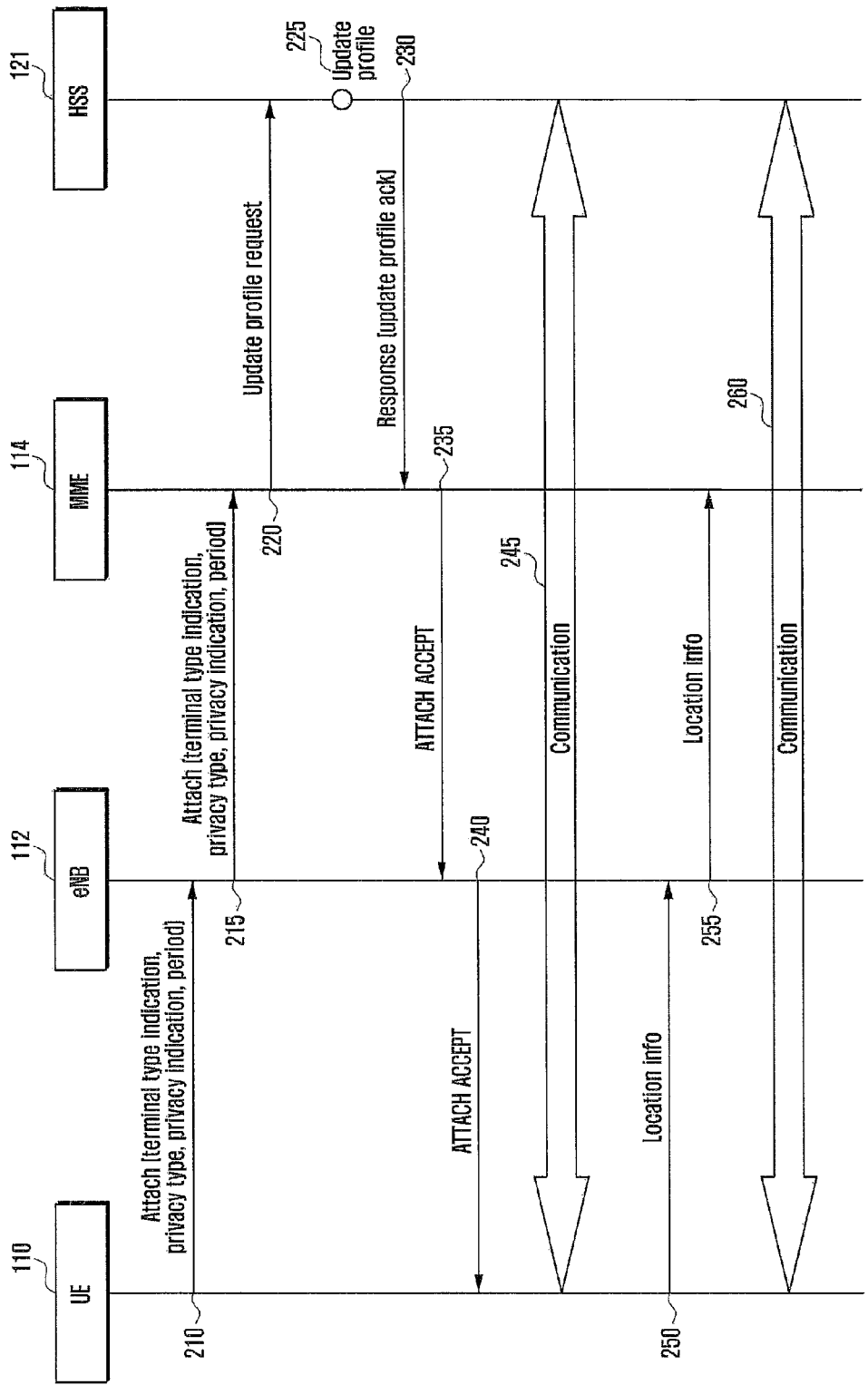
FIG. 2 is a flow chart illustrating a procedure of transmitting and receiving privacy information in a terminal according to a first embodiment of the present invention.

FIG. 2 is a flow chart illustrating a procedure of transmitting and receiving privacy information in a terminal according to a first embodiment of the present invention.

The UE 110 transmits a connection (ATTACH) message to a base station 112 at step 210. The connection message may include a terminal type indication, privacy type, privacy indication, and period. Some of this information may not be included in the connection message according to embodiments. Further this information may not be included in the connection message and separately transmitted to the base station 112. This is applied to step 215 in the same way.

The terminal type indication sets a lower priority to an M2M communication terminal, which may be called low priority indication.

The privacy type is a field to inform with which type of privacy the terminal transmits and receives information. For example, the privacy type may be provided to transmit and receive information for an electronic health management (e-health), electronic call (e-call) of an automobile, and payment service of toll road tariffs.

The privacy indication informs whether to transmit a specific privacy. For example, the privacy indication may include a location information transmission indication for setting a transmission of location information.

The period is information related to with which period the terminal transmits privacy information.

The base station 112 transmits a connection (ATTACH) message to the MME 114 at step 215. Contents of privacy included in the connection message are same as step 210. The MME 114 transmits a request for updating a profile to the HSS 121 at step 220. The request for updating a profile may be a specific item included in the connection message. The HSS 121 updates a profile of corresponding terminal according to the request for updating a profile at step 225. The HSS 121 transmits a profile update acknowledgement to the MME 114 at step 230. The MME 114 transmits a connection complete (ATTACH ACCEPT) message to the base station 112 at step 235. Accordingly, the base station 112 transmits a connection complete message to the terminal 110 at step 240. Subsequently, a communication between the terminal 110 and other entities is performed at step 245.

The terminal 110 transmits location information to the base station 112 at step 250. For example, the terminal 110 can transmits the location information to the base station 112 if a transmitting period of the location information is elapsed or a specific user input is received. Further, the terminal 110 can transmit the location information to the base station 112 if a specific situation is detected. For example, the terminal 110 can transmits the location information to the base station 112 if it is identified that the terminal 110 is located out of a predetermined area, or the temperature or humidity is out of a predetermined range. The base station 112 transmits the received location information to the MME 114 at step 255. Subsequently, a communication between the terminal 110 and other entities is performed at step 260.

Figure 3:
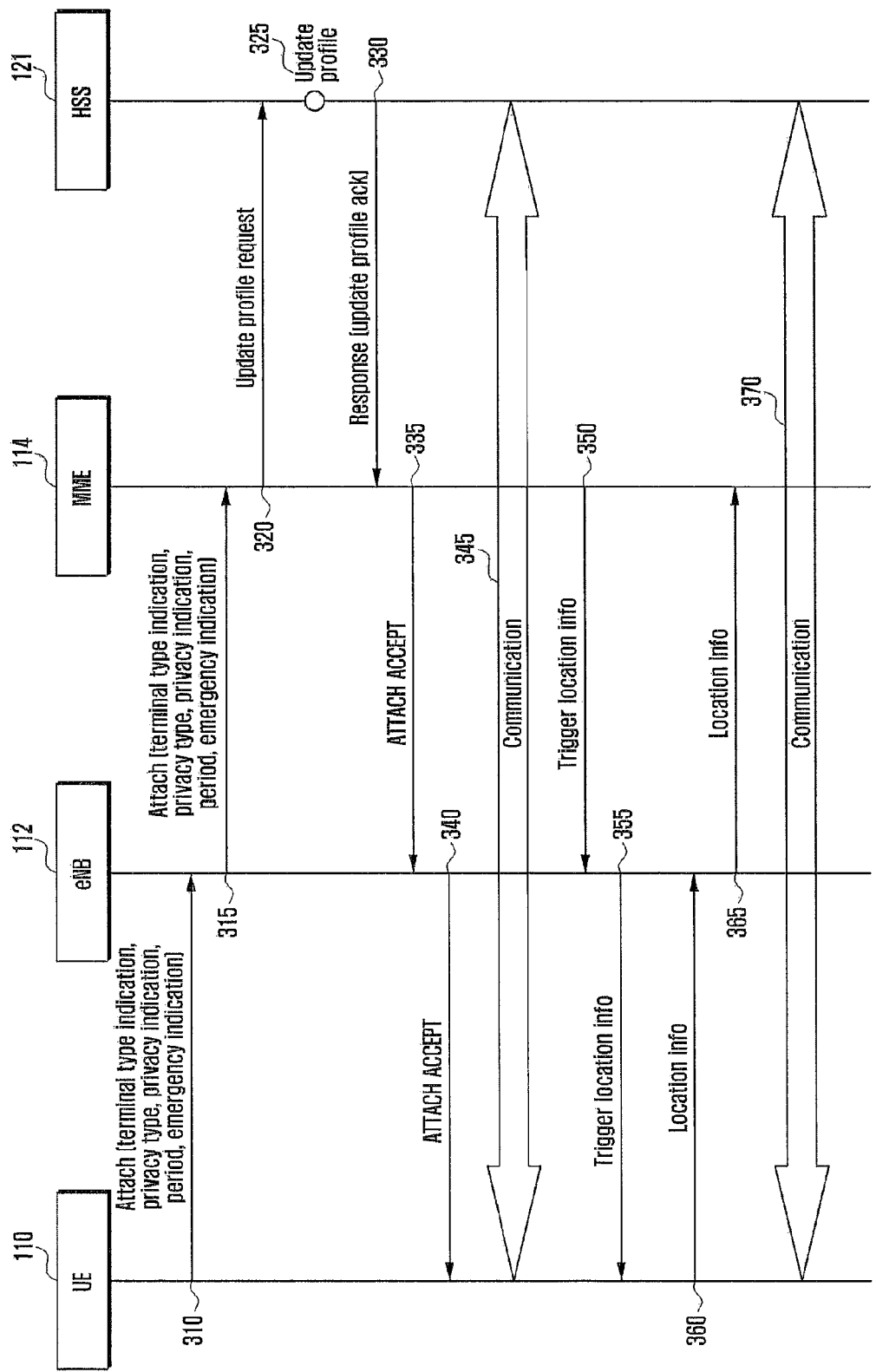
FIG. 3 is a flow chart illustrating a procedure of transmitting and receiving privacy information in a terminal according to a second embodiment of the present invention.

FIG. 3 is a flow chart illustrating a procedure of transmitting and receiving privacy information in a terminal according to a second embodiment of the present invention.

The UE 110 transmits a connection (ATTACH) message to the base station 112 at step 310. Like the first embodiment, the connection message may include a terminal type indication, privacy type, privacy indication, and period. Some of this information may not be included in the connection message according to embodiments. Further this information may not be included in the connection message and separately transmitted to the base station 112. This is applied to step 315 in the same way. However, differently from the first embodiment, the UE 110 transmits an emergency indication to the base station 112 by including in the connection message or together with the connection message at step 310. The terminal 110 transmits a connection message including an emergency indication if a user's emergency input is received or an emergency situation is detected. For example, if a user's heart rate or blood pressure is greater than a predetermined danger value, the terminal 110 can transmit a connection message including an emergency indication.

The base station 112 transmits a connection (ATTACH) message to the MME 114 at step 315. Contents included in the connection message is same as the step 310. The MME 114 transmits a request for updating a profile to the HSS 121 at step 320. The request for updating a profile may be a specific item included in the connection message. According to the second embodiment, the request for updating a profile may not include an emergency indication. The HSS 121 updates a profile of corresponding terminal according to the request for updating a profile at step 325. The HSS 121 transmits a profile update acknowledgement to the MME 114 at step 330. The MME 114 transmits a connection complete (ATTACH ACCEPT) message to the base station 112 at step 335. Accordingly, the base station 112 transmits a connection complete message to the terminal 110 at step 340. Subsequently, a communication between the terminal 110 and other entities is performed at step 345.

If an emergency indication informing an emergency situation is included in the connection request message, the MME 114 transmits a location information trigger to the base station 112 at step 350. The base station 112 transmits the received location information trigger to the terminal 110 at step 355. The terminal 110, which received the location information trigger, transmits the location information of the terminal 110 to the base station 112 at step 360. The base station 112 transmits the received location information to the MME 114 at step 365. Subsequently, the terminal 110 performs a communication with other entities at step 370. Through the communication, the terminal 110 can perform an operation suitable for the emergency situation, or display/output a proper guide or warning. Further, the location information transmitted to the base station 112 and/or MME 114 may be used by a national organization or a hospital in order to rescue a user in the emergency situation.

Figure 4:
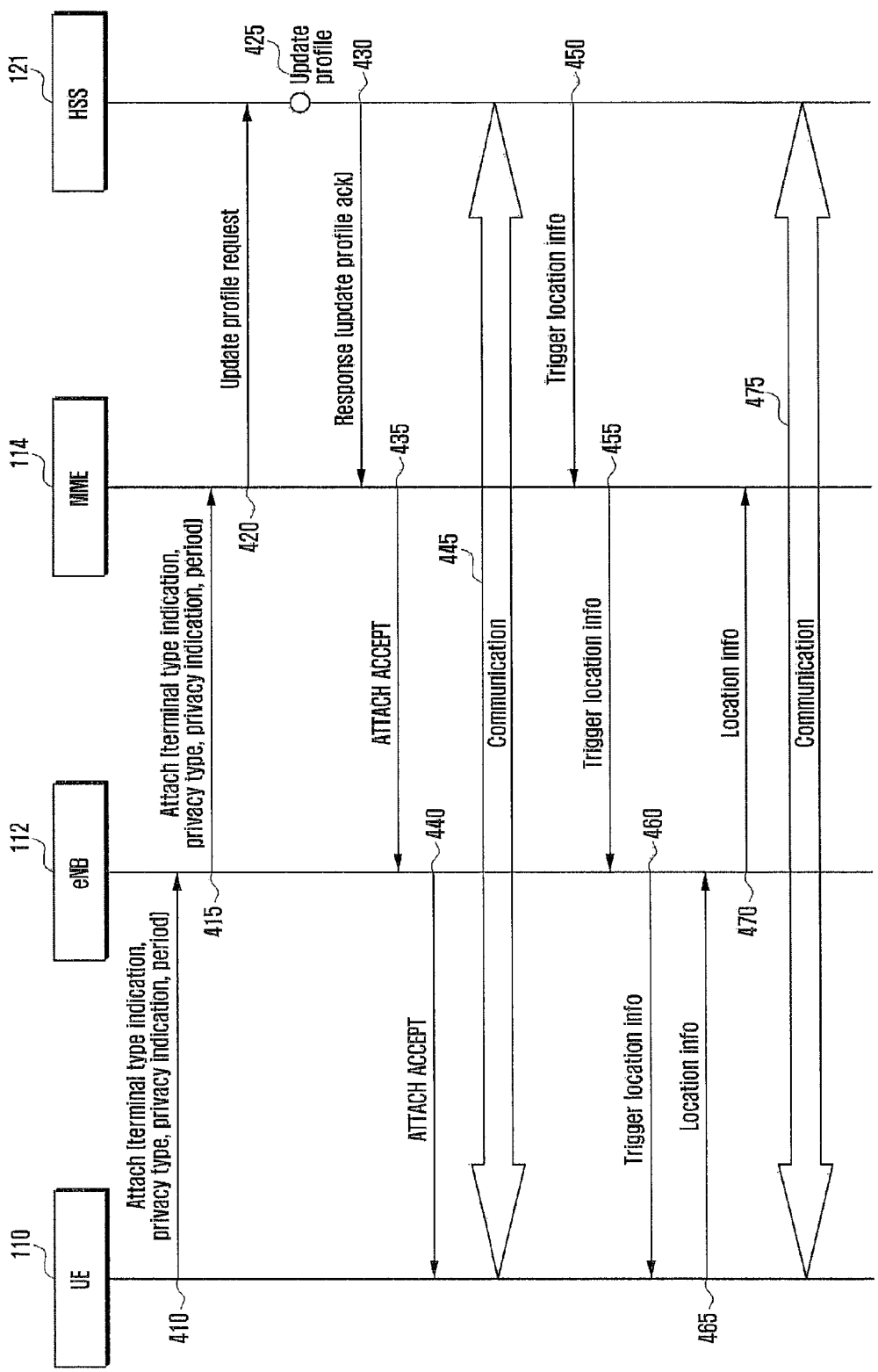
FIG. 4 is a flow chart illustrating a procedure of transmitting and receiving privacy information in a terminal according to a third embodiment of the present invention.

FIG. 4 is a flow chart illustrating a procedure of transmitting and receiving privacy information in a terminal according to a third embodiment of the present invention.

Steps 410 to 445 of FIG. 4 are similar to steps 210 to 245 of FIG. 2, and thereby detailed description is omitted here. Like the embodiment of FIG. 2, a request related to privacy is transmitted from the terminal 110 to the HSS 121, and accordingly a profile is updated.

Subsequently, when a predetermined transmission period of location information is elapsed at step 425, the HSS 121 transmits a location information trigger to the MME 114 at step 450. The MME 114 transmits the received location information trigger to the base station 112 at step 455. The base station 112 transmits the received location information trigger to the terminal 110 at step 460. The terminal 110, which received the location information trigger, transmits the location information of the terminal 110 to the base station 112 at step 465. The base station 112 transmits the received location information to the MME 114 at step 470. Subsequently, the terminal 110 performs a communication with other entities at step 475. The location information transmitted to the base station 112 and/or MME 114 through the communication may be used to provide a user service.

Figure 5:
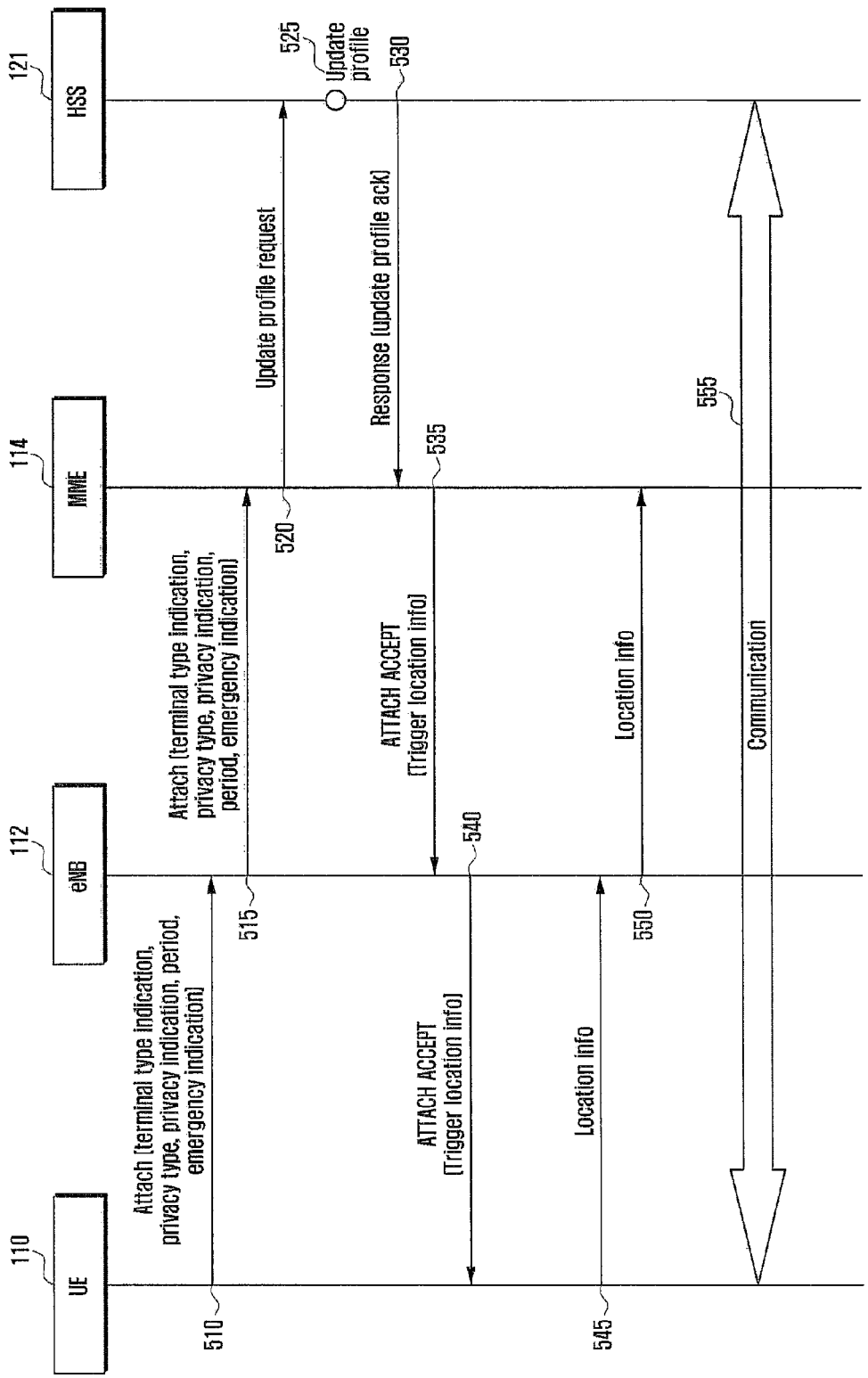
FIG. 5 is a flow chart illustrating a procedure of transmitting and receiving privacy information in a terminal according to a fourth embodiment of the present invention.

FIG. 5 is a flow chart illustrating a procedure of transmitting and receiving privacy information in a terminal according to a fourth embodiment of the present invention.

Steps 510 to 530 of FIG. 5 are similar to steps 310 to 330 of FIG. 3, and thereby detailed description is omitted here. Like the embodiment of FIG. 3, a request related to privacy is transmitted from the terminal 110 to the HSS 121, and accordingly a profile is updated.

However, the MME 114, which identified an indication for informing an emergency situation, transmits a location information trigger to the base station 112 together with a connection complete message at step 535. The connection complete message may include a location information trigger. Further, according to another embodiment, the location information trigger may be transmitted together with a connection complete message or right after transmitting the connection complete message. The base station 112 transmits the location information trigger to the terminal 110 together with the connection complete message at step 540. Similarly, according to another embodiment, the location information trigger may be transmitted by including in the connection complete message or right after transmitting the connection complete message.

The terminal 110, which received the location information trigger, transmits location information of the terminal 110 to the base station 112 at step 545. The base station 112 transmits the received location information to the MME 114 at step 550. Subsequently, the terminal 110 performs a communication with other entities at step 555. The terminal 110 can perform an operation suitable for an emergency situation or display/output a proper guide or warning through the communication. Further, the location information transmitted to the base station 112 and/or MME 114 may be used by a national organization or a hospital in order to rescue a user in an emergency situation.

Figure 6:
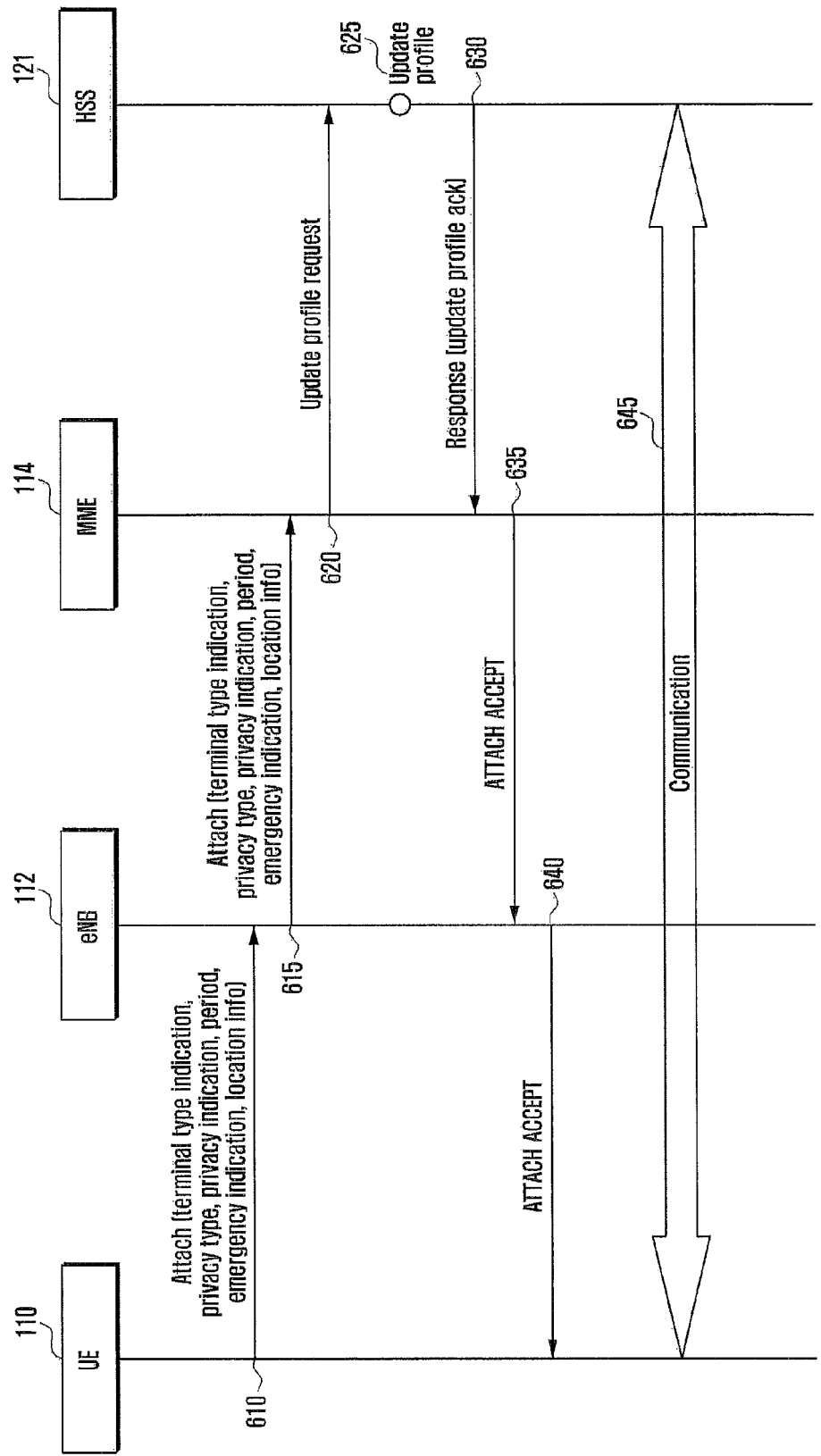
FIG. 6 is a flow chart illustrating a procedure of transmitting and receiving privacy information in a terminal according to a fifth embodiment of the present invention.

FIG. 6 is a flow chart illustrating a procedure of transmitting and receiving privacy information in a terminal according to a fifth embodiment of the present invention.

The UE 110 transmits a connection (ATTACH) message to the base station 112 at step 610. Like the second embodiment, the connection message may include a terminal type indication, privacy type, privacy indication, period, and emergency indication. Some of the above information may not be included in the connection message according to embodiments. Further this information may be separately transmitted to the base station 112 without including in the connection message or transmitted together with the connection message. This is applied to step 615 in the same way. However, differently from the second embodiment, the UE 110 transmits the location information to the base station 112 by including in the connection message or together with the connection message at step 610. If a user's emergency input is received or an emergency situation is detected, the terminal 110 transmits a connection message including an emergency indication and location information of the terminal 110. For example, if a user's heart rate or blood pressure is greater than a predetermined danger value, the terminal 110 can transmit a connection message including an emergency indication and location information of the terminal 110.

The base station 112 transmits a connection (ATTACH) message to the MME 114 at step 615. Contents included in the connection message are same as step 610. The MME 114 transmits a request for updating a profile to the HSS 121 at step 620. The request for updating a profile may be a specific item included in the connection message. According to the fifth embodiment, the request for updating a profile may not include an emergency indication. The HSS 121 updates a profile of corresponding terminal according to the request for updating a profile at step 625. The HSS 121 transmits a profile update acknowledgement to the MME 114 at step 630. The MME 114 transmits a connection complete (ATTACH ACCEPT) message to the base station 112 at step 635. Accordingly, the base station 112 transmits a connection complete message to the terminal 110 at step 640. Subsequently, a communication between the terminal 110 and other entities is performed at step 645. The terminal 110 can perform an operation suitable for an emergency situation or display/output a proper guide or warning. Further, the location information transmitted to the base station 112 and/or MME 114 may be used by a national organization or a hospital in order to rescue a user in an emergency situation.

Figure 7:
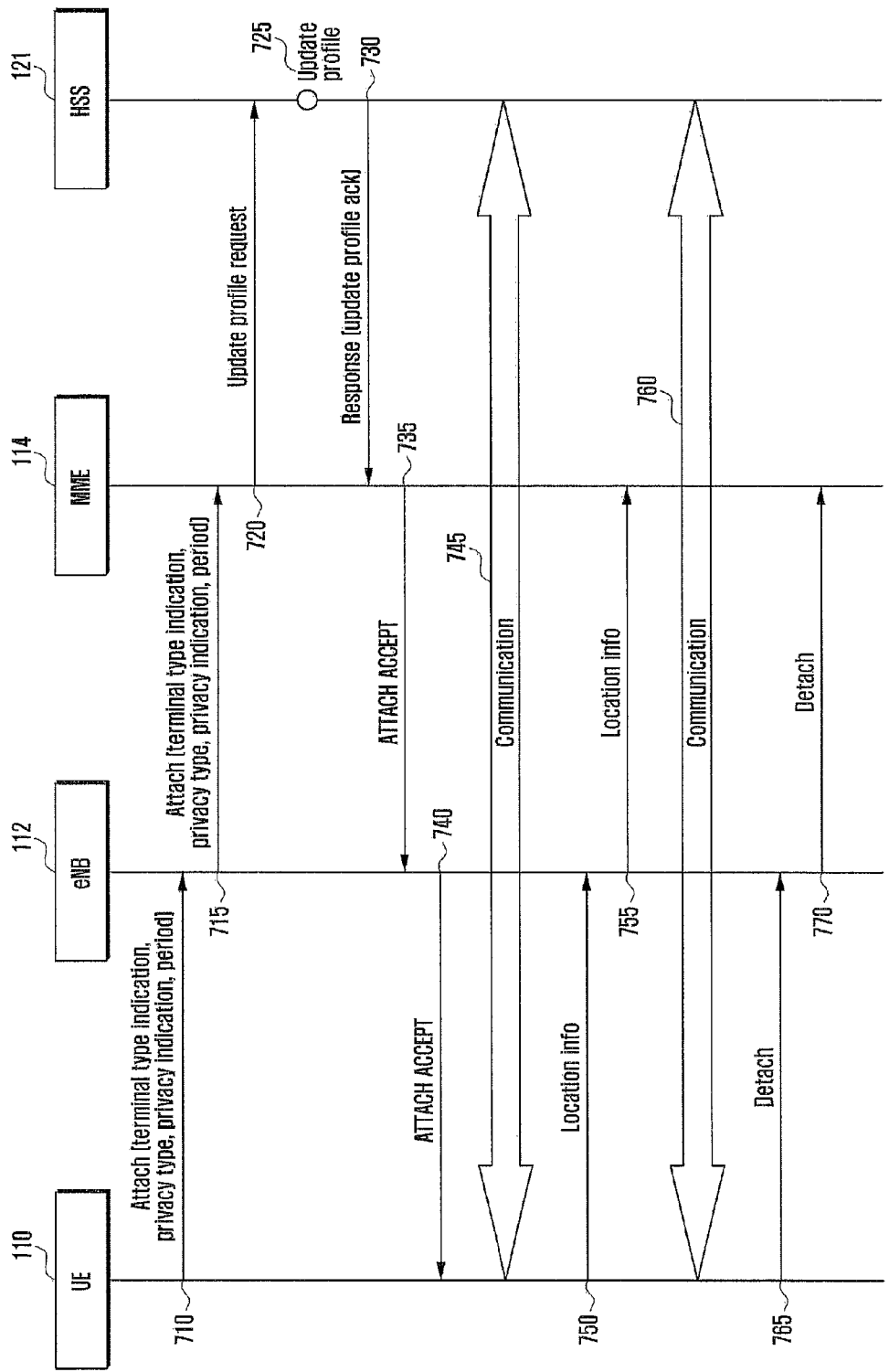
FIG. 7 is a flow chart illustrating a procedure of transmitting and receiving privacy information in a terminal according to a sixth embodiment of the present invention.
Figure 8:
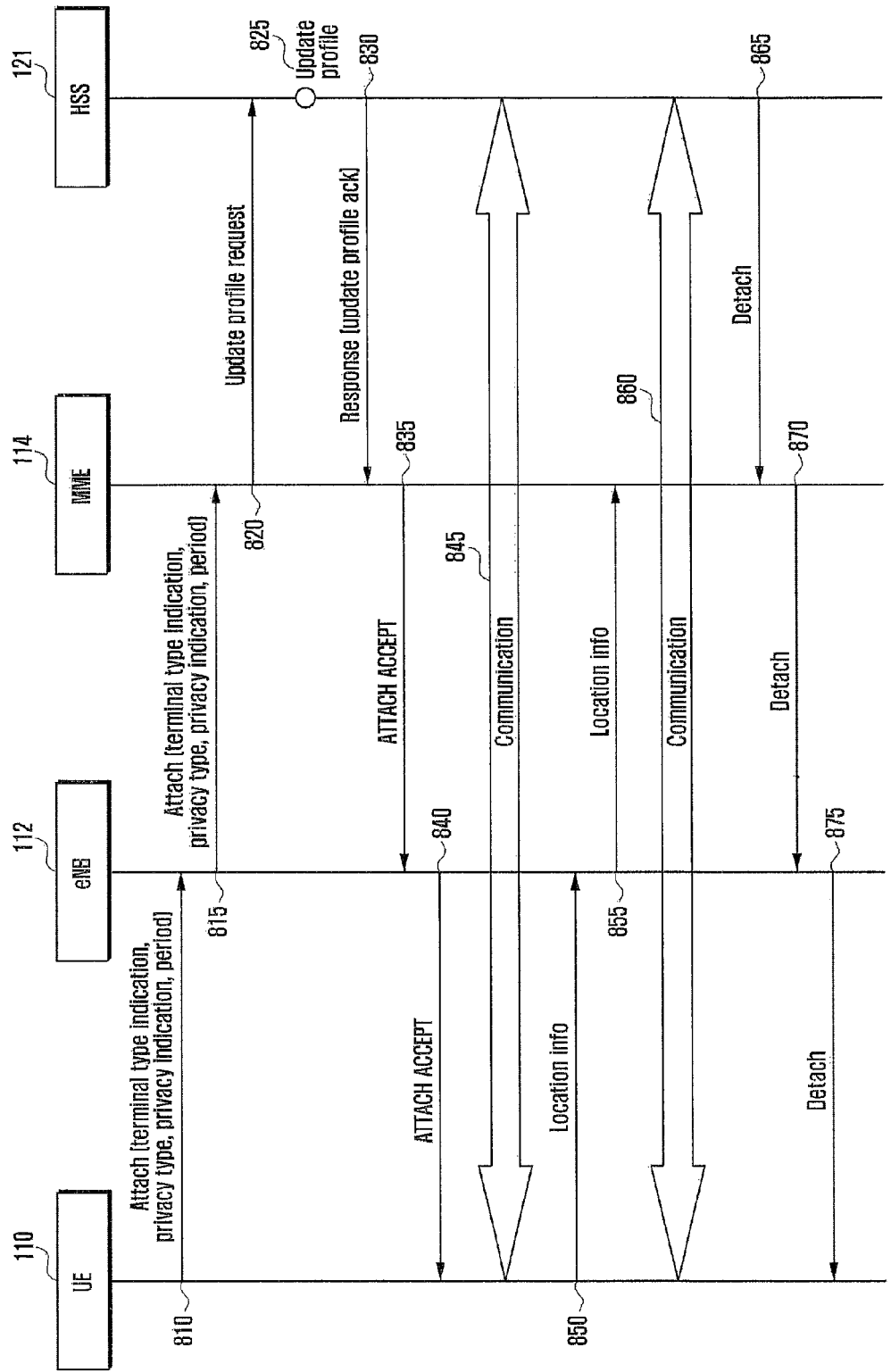
FIG. 8 is a flow chart illustrating a procedure of transmitting and receiving privacy information in a terminal according to a seventh embodiment of the present invention.
Figure 9:
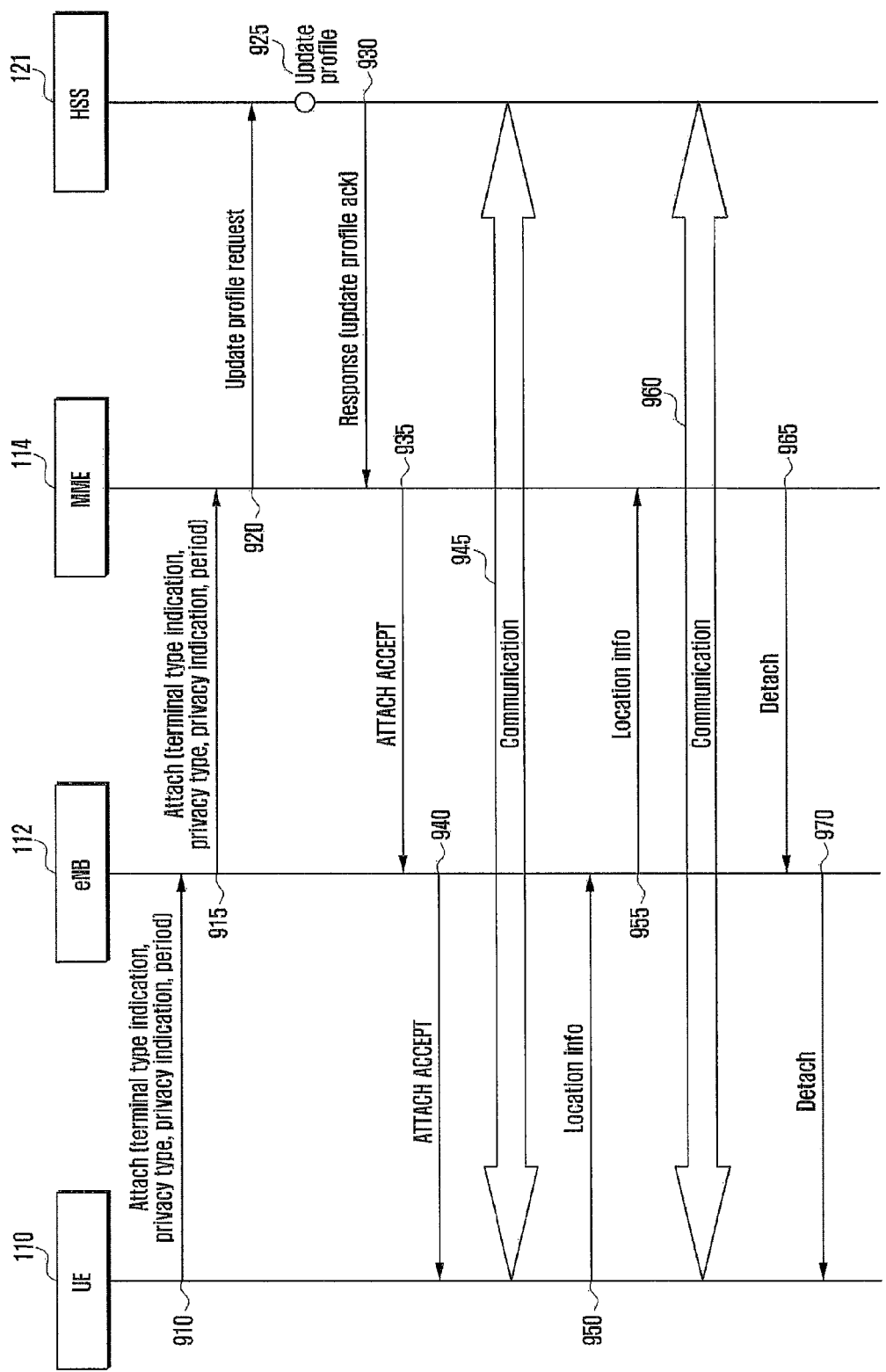
FIG. 9 is a flow chart illustrating a procedure of transmitting and receiving privacy information in a terminal according to an eighth embodiment of the present invention.

Embodiments of FIGS. 7 to 9 mainly relate to connection detach methods. In the embodiment of FIG. 7, the terminal 110 triggers a connection detach. In the embodiment of FIG. 8, the HSS 121 triggers a connection detach. In the embodiment of FIG. 9, the MME 114 triggers a connection detach.

FIG. 7 is a flow chart illustrating a procedure of transmitting and receiving privacy information in a terminal according to a sixth embodiment of the present invention.

Steps 710 to 760 of FIG. 7 are identical to steps 210 to 260 of FIG. 2, and thereby detailed description is omitted here. However, comparing to the procedure of FIG. 2, a step of detaching a connection is added in FIG. 7.

If the object of communication is accomplished at step 760, the terminal 110 transmits a connection detach message to the base station 112 at step 765. The connection detach message may include an indication which detaches a connection to protect location information. The base station 112 transmits the connection detach message to the MME 114. Accordingly, the connection detach is performed at step 770.

FIG. 8 is a flow chart illustrating a procedure of transmitting and receiving privacy information in a terminal according to a seventh embodiment of the present invention.

Steps 810 to 860 of FIG. 8 are identical to steps 210 to 260 of FIG. 2, and thereby detailed description is omitted here.

If the object of communication is accomplished at step 860, the HSS 121 transmits a connection detach message to the MME 114 according to a privacy profile at step 865. The connection detach message may include an indication which detaches the connection to protect location information. The MME 114 transmits the connection detach message to the base station 112 at step 870. The base station 112 transmits the connection detach message to the terminal 110 at step 875. Accordingly, the connection detach is performed.

FIG. 9 is a flow chart illustrating a procedure of transmitting and receiving privacy information in a terminal according to an eighth embodiment of the present invention.

Steps 910 to 960 of FIG. 9 are identical to steps 210 to 260 of FIG. 2, and thereby detailed description is omitted.

If the object of communication is accomplished at step 960, the MME 114 transmits a connection detach message to the base station 112 at step 965. The connection detach message may include an indication which detaches the connection to protect location information. The base station 112 transmits the connection detach message to the terminal 110 at step 970. Accordingly, the connection detach is performed.

Figure 10A:
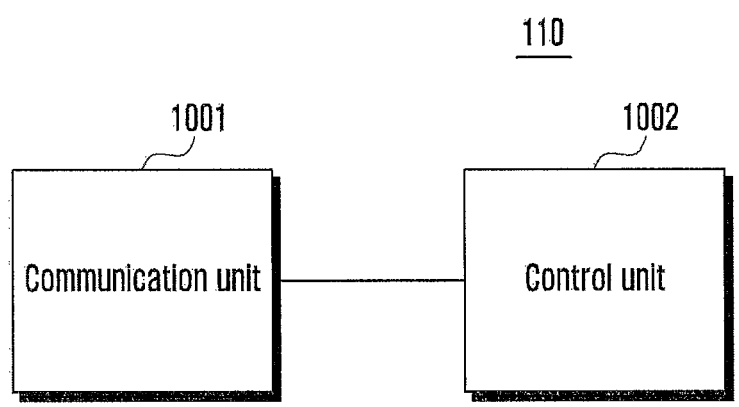
FIG. 10A is a block diagram illustrating a configuration of a terminal according to an embodiment of the present invention.

FIG. 10A is a block diagram illustrating a configuration of a terminal 110 according to an embodiment of the present invention.

The terminal 110 according to an embodiment of the present disclosure include a communication unit 1001 and a control unit 1002. The communication unit 1001 performs a wireless communication with the base station 112. The control unit 1002 controls the communication unit 1001 to transmit a connection request, connection detach message, and location information according to one of embodiments in FIGS. 2 to 9, and performs an operation according to a message received from a base station.

Figure 10B:
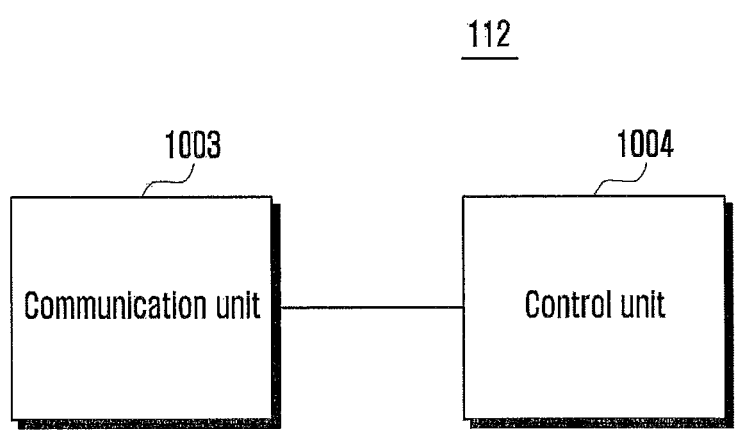
FIG. 10B is a block diagram illustrating a configuration of a base station according to another embodiment of the present invention.

FIG. 10B is a block diagram illustrating a configuration of a base station 112 according to another embodiment of the present invention.

The base station 112 according to another embodiment of the present disclosure include a communication unit 1003 and a control unit 1004. The communication unit 1003 performs a wireless communication with the terminal 110, and also performs communication with the MME 114 and HSS 121. The control unit 1004 controls the communication unit 1003 to transmit and receive a connection request, connection detach message, location information, and location information trigger according to one of embodiments in FIGS. 2 to 9, and performs an operation according to a message received from the terminal 110 or other entities.

Figure 10C:
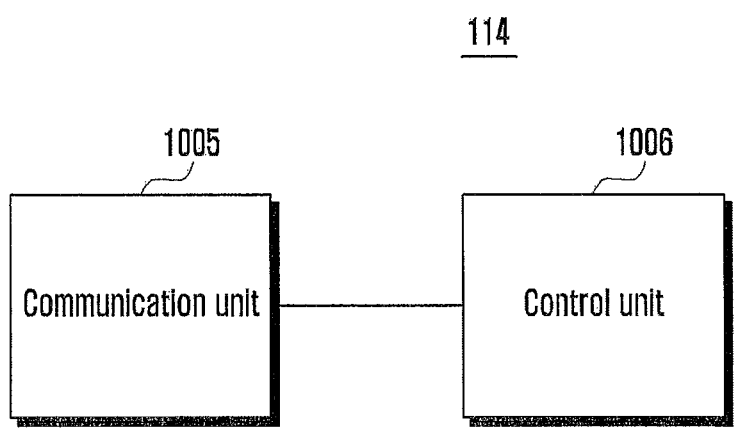
FIG. 10C is a block diagram illustrating a configuration of an MME according to another embodiment of the present invention.

FIG. 10C is a block diagram illustrating a configuration of an MME 114 according to another embodiment of the present invention.

The MME 114 according to another embodiment of the present disclosure includes a communication unit 1005 and a control unit 1006. The communication unit 1005 performs a communication with other entities of wireless communication. The control unit 1006 controls the communication unit 1005 to transmit and receive a connection request, connection detach message, and location information according to one of embodiments in FIGS. 2 to 9, transmits a profile update request, and performs an operation according to a message received from the terminal 110 or other entities.

Figure 10D:
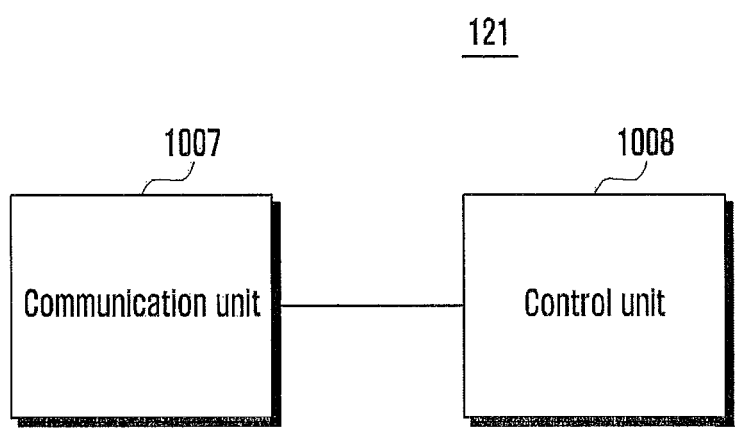
FIG. 10D is a block diagram illustrating a configuration of a HSS according to another embodiment of the present invention.

FIG. 10D is a block diagram illustrating a configuration of a HSS 121 according to another embodiment of the present invention.

The HSS 121 according to another embodiment of the present disclosure include a communication unit 1007 and a control unit 1008. The communication unit 1007 performs a communication with other entities of wireless communication network. The control unit 1008 controls the communication unit 1007 to receive a profile update request, to update the profile accordingly, and respond according to one of embodiments in FIGS. 2 to 9. The communication unit 1007 can transmit a location information trigger.

Here, it is to be understood that each block and combinations of the flow charts can be performed by computer program instructions. The computer program instructions can be launched on a general-purpose computer, special computer, or programmable processor of data processing equipment, and thereby instructions executed through the computer or programmable processor of data processing equipment generates means for performing functions described in the blocks of the flow charts. The computer program instructions can be stored in a computer-related or computer-readable memory of a computer or programmable processor of data processing equipment, and thereby products including instruction means for performing the blocks of the flow charts can be provided. Because the computer program instructions can be launched on a computer or programmable data processing equipment, a series of operation steps can be executed in the computer or programmable data processing equipment and process steps executable by a computer can be generated to perform functions described in the blocks of the flow chart.

Further, each block may indicate a module, segment, and portion of codes including executable instructions for performing specific logical functions. Further, it is to be understood that the order of functions described in the blocks can be modified as alternative embodiments. For example, two adjacent blocks can be executed at the same time or in the reverse order.

In the embodiments of the present invention, a term 'unit' means a software or hardware component such as a FPGA or ASIC, and performs a specific function. However, the 'unit' is not limited to the software or hardware. The 'unit' can be configured to be stored in an addressable storage media and to operate at least one processor. Accordingly, the 'unit' can include software components, object-oriented software components, class components, and task components, processes, functions, attributes, procedures, subroutines, segments of program codes, drivers, firmware, microcode, circuits, data, database, data structures, tables, arrays, and variables. The components and functions provided by the 'unit' can be combined with a lesser number of components or divided into additional components and units. Furthermore, the components and units can be configured to operate at least one CPU in a device or a security multimedia card.

Although embodiments of the disclosure have been described in detail hereinabove, it should be understood that many variations and modifications of the basic inventive concept described herein will still fall within the spirit and scope of the disclosure as defined in the appended claims.

The invention claimed is:

1. A method for transmitting privacy information by a user equipment (UE), the method comprising:
    transmitting, to an evolved Node B (eNB), a connection (ATTACH) message including a terminal type indication, a privacy type, a privacy indication, and a transmission period, the privacy indication indicating whether to transmit location information for the UE supporting a machine type communication (MTC);
    receiving, from the eNB, a connection complete (ATTACH ACCEPT) message after a profile of the UE is updated based on the terminal type indication, the privacy type, the privacy indication, and the transmission period;
    determining whether to transmit the location information for the UE based on the privacy indication; and
    if the location information is determined to transmit based on the privacy indication, transmitting the location information according to the transmission period,
    wherein the privacy type indicates a type of service associated with the location information.

2. The method of claim 1, wherein transmitting the location information comprises transmitting the location information if the transmission period has elapsed.

3. The method of claim 1, wherein transmitting the location information comprises transmitting the location information if a location information trigger is received.

4. The method of claim 1, wherein the connection message includes an emergency indication if an emergency situation is detected.

5. The method of claim 4, wherein transmitting the location information comprises transmitting the location information if the connection complete message is received after transmitting the connection message including the emergency indication.

6. The method of claim 4, further comprising transmitting the location information if a location information trigger is received after receiving the connection message including the emergency indication.

7. The method of claim 1, wherein the connection message includes an emergency indication and location information if an emergency situation is detected.

8. The method of claim 1, further comprising transmitting a connection detach message after transmitting the location information.

9. The method of claim 1, wherein the terminal type indication sets a low priority to a mobile-to-mobile (M2M) communication terminal.

10. A user equipment (UE) for transmitting privacy information, the UE comprising:
    a transceiver configured to communicate with an evolved Node B (eNB); and
    a controller configured to:
        control the transceiver to transmit a connection (ATTACH) message including a terminal type indication, a privacy type, a privacy indication, and a transmission period, receive a connection complete (ATTACH ACCEPT) message after a profile of the UE is updated based on the terminal type indication, the privacy type, the privacy indication, and the transmission period;
        determine whether to transmit location information for the UE based on the privacy indication, and if the location information is determined to transmit based on the privacy indication; and
        transmit the location information according to the transmission period, wherein the privacy type indicates a type of service associated with the location information, and wherein the location information is for the UE supporting a machine type communication (MTC).

11. The UE of claim 10, wherein the controller is configured to control the transceiver to transmit the location information if the transmission period has elapsed.

12. The UE of claim 10, wherein the controller is configured to control the transceiver to transmit the location information if a location information trigger is received.

13. The UE of claim 10, wherein the connection message includes an emergency indication if an emergency situation is detected.

14. The UE of claim 13, wherein the controller is configured to control the transceiver to transmit the location information if the connection complete message is received after transmitting the connection message including the emergency indication.

15. The UE of claim 13, wherein the controller is configured to control the transceiver to transmit the location information if a location information trigger is received after transmitting the connection message including the emergency indication.

16. The UE of claim 10, wherein the connection message includes an emergency indication and location information if an emergency situation is detected.

17. The UE of claim 10, wherein the controller is configured to control the transceiver to transmit a connection detach message after transmitting the location information.

18. The UE of claim 10, wherein the terminal type indication sets a low priority to a mobile-to-mobile (M2M) communication terminal.

* * * * *